UNITED STATES PATENT OFFICE.

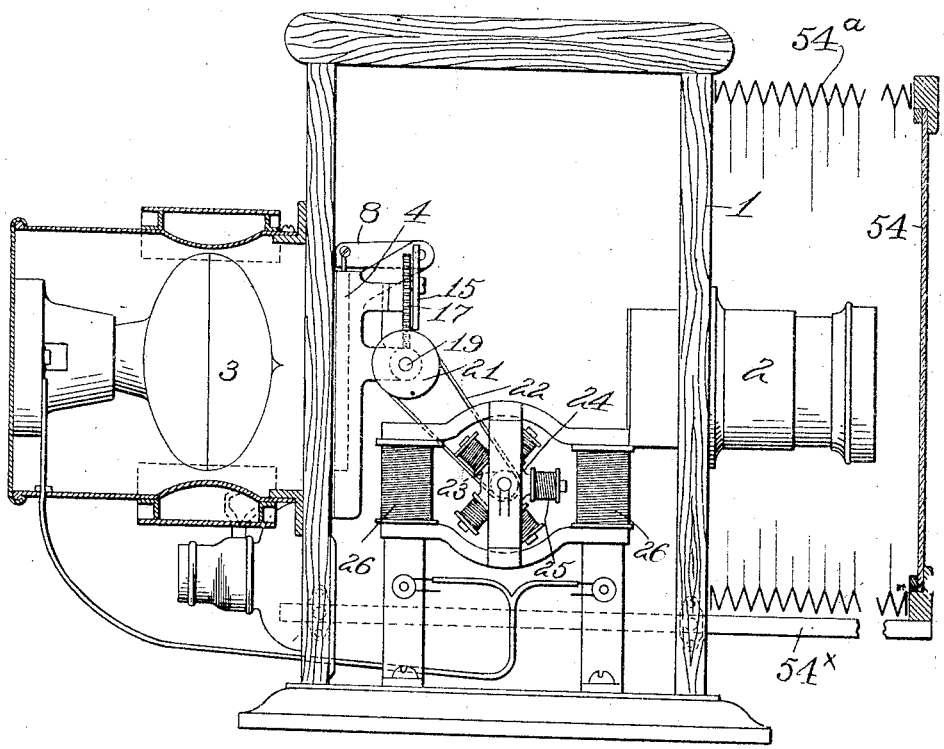

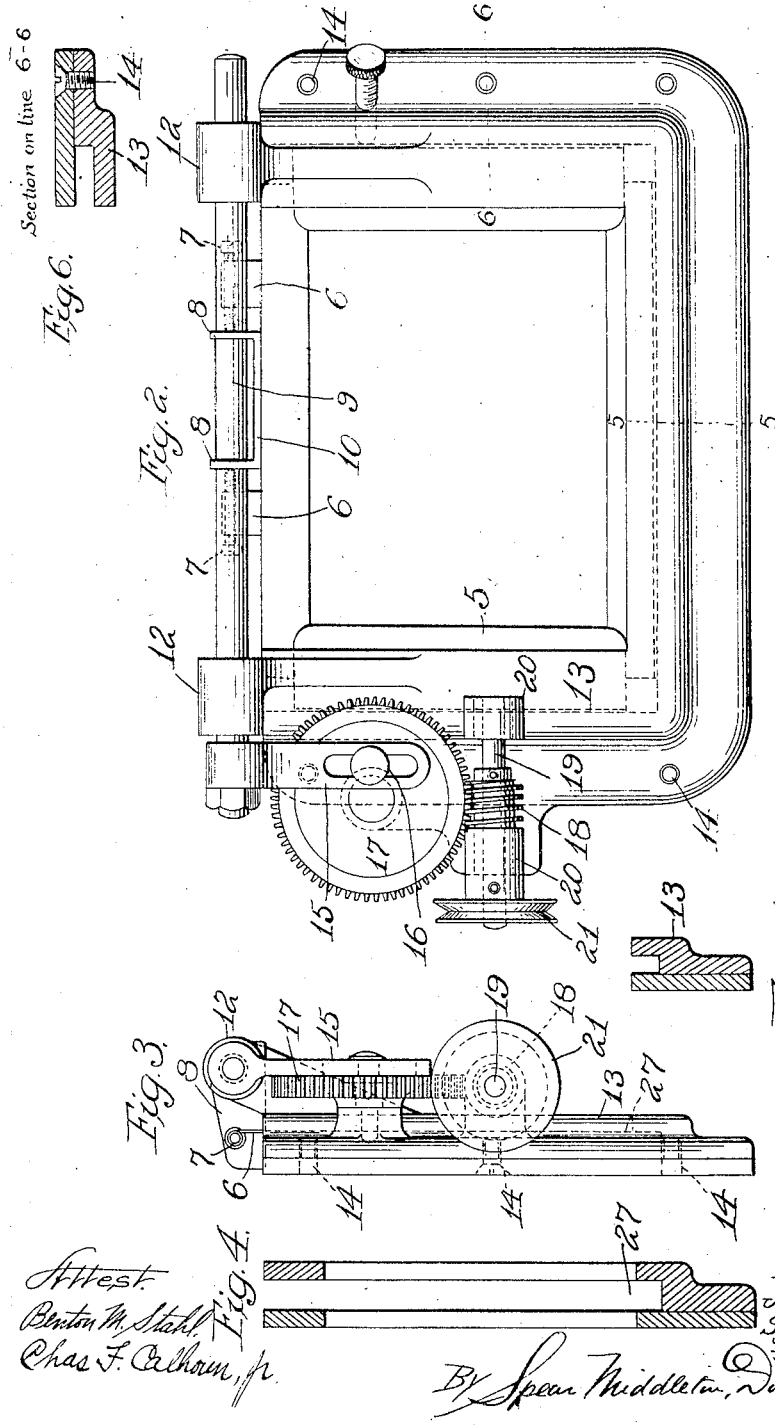

JAMES F. TILLEY, OF WASHINGTON, DISTRICT OF COLUMBIA, SYDNEY B. AUSTIN, OF BALTIMORE, MARYLAND, AND GEORGE B. HUTCHINGS, OF RICHMOND, VIRGINIA, ASSIGNORS, BY DIRECT AND MESNE ASSIGNMENTS, TO MOTT-LE-GAIGE ANIMATED ADVERTISING CORPORATION, OF NEW YORK, N. Y.

LANTERN-SLIDE DISPLAY APPARATUS.

1,187,794.  Specification of Letters Patent.  Patented June 20, 1916.

Application filed June 28, 1913. Serial No. 776,382.

*To all whom it may concern:*

Be it known that we, JAMES F. TILLEY, SYDNEY B. AUSTIN, and GEORGE B. HUTCHINGS, citizens of the United States, residing at Washington, District of Columbia, Baltimore, Maryland, and Richmond, Virginia, respectively, have invented certain new and useful Improvements in Lantern-Slide Display Apparatus, of which the following is a specification.

Our invention relates to display apparatus and particularly for use in connection with composite lantern slides in which a screen member and a picture carrying member are associated with each other and one is moved relatively to the other to expose different picture sections between the lines of the screen to produce motion picture effects.

One object of our present invention is to provide a machine for receiving and operating a single composite slide whereby the motion picture is displayed, the machine having mechanism for operating the slide in such relation that when the slide is placed in the machine by hand it will be in proper position to be operated by said mechanism.

The invention consists in the features and combination and arrangement of parts hereinafter described and particularly pointed out in the claims.

In the accompanying drawings, Figure 1 is a part side elevation and part sectional view of a machine embodying our invention. Fig. 2 is a front view of the mechanism for operating composite slides. Fig. 3 is a view of the mechanism shown in Fig. 2. Figs. 4, 5 and 6 are detail views.

In these drawings, 1 indicates the casing or frame of the apparatus which may be made of any suitable material such as wood or metal; 2 indicates generally the lens carrier or support, and 3 indicates generally any suitable lighting means. This lighting means is in the rear of the lantern slide which is placed at the point 4 by hand so as to be displayed by the light shining therethrough. The slide is of composite character consisting of two transparent members such as glass, one being a screen member made by providing parallel lines and spaces on the glass plate and the other member carrying the composite picture. The members of the composite slide are contained or held in a holder indicated generally in Fig. 2 at 5, but as this holder in its specific construction forms no part of our present invention it will not be necessary to describe it herein further than to say that one of the members of the composite slide is held in fixed position by this holder for instance, the screen member while the other member is adapted to have reciprocating movement in relation to the first member though the reverse may be done. For this purpose the last named member has connected thereto in any suitable manner, operating means which may be of various forms but in the particular construction shown this means consists of lugs 6 carrying bearing or contact members 7, in the form of screws which are adapted to be engaged by arms or lugs 8, suitably mounted on a reciprocating rod 9. We prefer to form these arms or lugs as extensions of a U-shaped member 10 held in fixed position on the said reciprocating rod. This rod reciprocates in bearings 12 of the frame member 13 which is fixed to the casing or main frame of the apparatus in any suitable way as by pins or screws at 14. The rod 9 is reciprocated by an arm 15 fixed thereto and having a pin and slot connection at 16 with a worm wheel 17 suitably mounted in the fixed frame or bracket 13 and operated by a worm 18 on a shaft 19 which is mounted in bearings 20 on said fixed frame or bracket, said shaft carrying a pulley 21 operated by a belt 22 from a pulley 23 of a motor 24. These operating connections may be of various forms and it will be understood that the form described is representative of any, suitable for the purpose.

The motor may be of any suitable form, but in the particular machine which we have used to illustrate our invention this is an electric motor, the armature being indicated at 25 and the field magnets at 26. Any suitable circuit connections may lead to this motor and the lighting means may be an electric lamp included in the circuit connections. The composite lantern slide or the holder carrying the members of said slide may be slid as one body down into place in the pocket or recess 27 of the frame or bracket 13, which thus provides a receptacle for this composite lantern slide or its holding frame, or the said slide may be removed from said receptacle and another slide inserted and it will be observed that this receptacle is located to one side of the operating mechanism as shown in Fig. 3, or rather to one side of the rod 9, and the operating connections therefor, and that the arms 8 reach over from the reciprocating rod 9 to engage the projections or other contact or bearing means as 7 for giving relative movement to the members of the composite slide. By this construction the recess in the receptacle or holder for the composite slide will be left unobstructed at its upper end so that the slide may be slipped down into place when the arms 8 are tilted up to a vertical position from the position shown in Fig. 3, and when the composite slide is positioned in the receptacle and the arms 8 are lowered the connection between the movable member of the composite slide and the operating mechanism is established, and upon starting the motor and turning on the light the picture will be thrown upon the screen placed in front of the lens 2.

The lantern slide may be of the form shown in Letters Patent of the United States #1111635, of September 22, 1914. When such a slide is placed in the holder, one member thereof will be held by the walls of the holder, while the other member may be moved in relation to the first member.

It will be understood that we do not limit ourselves to any particular form or arrangement of image projecting apparatus, nor do we limit ourselves to any particular power applied to the automatic device for operating the movable member of the display device.

The composite slide may be of the same form as that disclosed in Letters Patent of the United States granted to Tilley & Austin Sept. 22, 1914 No. 1,111,625.

Our present invention, in some of its aspects, is similar to that disclosed in the Letters Patent just mentioned, and except where the claims appended hereto are directed to features relating to the apparatus for receiving a single display device by hand, we do not limit our invention to such form of apparatus.

It will be noticed from Fig. 1 that the screen or ground glass member 54 may be mounted on adjustable rods 54ˣ, and a suitable bellows indicated in dotted lines may be employed at 54ˣ.

We claim:—

1. A display apparatus comprising a frame, lighting means, a composite display device comprising a screen member, a picture member together with a holder for said members allowing one to move relatively to the other, a support for holding the composite display device removably at the display point when placed thereon by hand and means in fixed relation to the display point for engaging and operating the composite display device by giving a relative reciprocating movement to the members in one direction when at the display point, substantially as described.

2. A display apparatus comprising means for projecting an image, display means comprising a transparent screen member, a picture carrying member, means for supporting said members removably at the display point when placed therein by hand and means arranged in fixed relation to and adjacent the display point for engaging one of said members when placed in position at the display point for reciprocating said member relatively to the other member, substantially as described.

3. A display apparatus comprising means for projecting an image, a recessed support and holder at the display point, to support the display means removably when placed therein by hand, display means consisting of a transparent screen member and a picture carrying member, and automatic means for reciprocating one of said members in relation to the other when placed in said recessed holder, substantially as described.

4. In a display apparatus, a frame, means for projecting images, display means comprising a screen member and a picture carrying member, with means for removably holding said members at the display point when placed by hand, a reciprocating device adjacent the display point and in fixed relation thereto, said reciprocating device engaging removably one of the said members when placed at the display point for reciprocating it in relation to the other member, substantially as described.

5. In a display apparatus, a frame, means for projecting images, display means comprising a screen member and a picture carrying member, with means for removably holding said members at the display point when placed by hand, a reciprocating device adjacent the display point and in fixed relation thereto, said reciprocating device engaging removably one of the said members when placed at the display point for reciprocating it in relation to the other member, said reciprocating device consisting of a rod with a member thereon for operating the display member, substantially as described.

6. In combination a fixed frame, means for projecting an image, a receptacle, display means comprising a screen member and a picture carrying member, one of which is movable in relation to the other, said receptacle holding the said display means removable when placed therein by hand and means supported on the fixed frame for operating the movable member, said means being removably connected with the movable member when the latter is placed in the receptacle.

7. In combination a fixed frame, means for projecting images, a holder on the frame removably holding display means when placed therein by hand, said display means comprising a screen member and a picture member, one of said members being movable in relation to the other and operating means on the fixed frame to connect with the upper part of the movable member when the latter is inserted in the holder, substantially as described.

8. In combination a fixed frame, means for projecting images, a holder on the frame removably holding display means when placed therein by hand, display means comprising a screen member and picture member, one of said members being movable in relation to the other and operating means on the fixed frame to connect with the upper part of the movable member when the latter is inserted in the holder, said operating means including a member shiftable into and out of connection with the said movable member, substantially as described.

9. In combination a fixed frame, means for projecting an image, a holder on the fixed frame at the display point, display means to be held by said holder and comprising a screen member and a picture member, one movable in relation to the other, the movable member having a contact portion, a reciprocating rod on the fixed frame and an arm pivoted on said rod to connect with or disconnect from the contact on the movable member, substantially as described.

10. In combination in display apparatus, a frame, a holder thereon to receive display devices by hand, a display device consisting of a screen member and a picture carrying member with a holder therefor consisting of the two frames, one slidable on the other, and each connected to one of said members, the said holder being fitted to hold the one frame rigidly in place, and means for reciprocating the slidable member, said means being supported on the main frame and with which the slidable member removably connects, substantially as described.

11. In combination in a display apparatus, a frame, a screen member, a picture carrying member, one movable in relation to the other, a holder for said members to and from which said members are placed and removed by hand, a device mounted on the frame to have reciprocating movement and to connect with and disconnect from the movable member when positioned at or moved from the display point and a rotary driver with connections therefrom for driving the reciprocating device, substantially as described.

In testimony whereof, we affix our signatures in presence of two witnesses.

JAMES F. TILLEY.
SYDNEY B. AUSTIN.
GEORGE B. HUTCHINGS.

Witnesses to signatures of Tilley and Hutchings:
F. L. MIDDLETON,
WALTER DONALDSON.
Witnesses to signature of S. B. Austin:
JOHN D. NOCK,
CHAS. EVARLEY MYERS.